US008271279B2

(12) United States Patent
Hetherington et al.

(10) Patent No.: US 8,271,279 B2

(45) Date of Patent: *Sep. 18, 2012

(54) SIGNATURE NOISE REMOVAL

(75) Inventors: Phillip A. Hetherington, Port Moody (CA); Shreyas A. Paranjpe, Vancouver (CA)

(73) Assignee: QNX Software Systems Limited, Kanata, Ontario (CA)

( * ) Notice: Subject to any disclaimer, the term of this patent is extended or adjusted under 35 U.S.C. 154(b) by 1381 days.

This patent is subject to a terminal disclaimer.

(21) Appl. No.: 11/607,340

(22) Filed: Nov. 30, 2006

(65) Prior Publication Data

US 2007/0078649 A1 Apr. 5, 2007

Related U.S. Application Data

(63) Continuation-in-part of application No. 11/331,806, filed on Jan. 13, 2006, which is a continuation-in-part of application No. 11/252,160, filed on Oct. 17, 2005, which is a continuation-in-part of application No. 10/688,802, filed on Oct. 16, 2003, which is a continuation-in-part of application No. 10/410,736, filed on Apr. 10, 2003, application No. 11/607,340, which is a continuation-in-part of application No. 11/006,935, filed on Dec. 8, 2004, which is a continuation-in-part of application No. 10/688,802.

(60) Provisional application No. 60/449,511, filed on Feb. 21, 2003.

(51) Int. Cl.
*G10L 15/20* (2006.01)
*G10L 21/02* (2006.01)

(52) U.S. Cl. ......... 704/233; 704/205; 704/211; 704/226

(58) Field of Classification Search .................. 704/226, 704/233, 205, 211
See application file for complete search history.

(56) References Cited

U.S. PATENT DOCUMENTS

| | | | |
|---|---|---|---|
| 4,486,900 | A | 12/1984 | Cox et al. |
| 4,531,228 | A | 7/1985 | Noso et al. |
| 4,630,304 | A | 12/1986 | Borth et al. |
| 4,630,305 | A | 12/1986 | Borth et al. |
| 4,811,404 | A | 3/1989 | Vilmur et al. |
| 4,843,562 | A | 6/1989 | Kenyon et al. |

(Continued)

FOREIGN PATENT DOCUMENTS

| | | |
|---|---|---|
| CA | 2158847 | 9/1994 |

(Continued)

OTHER PUBLICATIONS

Vaseghi "Advanced Digital Signal Processing and Noise Reduction", Publisher, John Wiley and Sons, 2000.*

(Continued)

*Primary Examiner* — Jialong He

(74) *Attorney, Agent, or Firm* — Brinks Hofer Gilson & Lione

(57) ABSTRACT

A speech enhancement system improves the perceptual quality of a processed voice signal. The system improves the perceptual quality of a voice signal by removing unwanted noise components from a voice signal. The system removes undesirable signals that may result in the loss of information. The system receives and analyzes signals to determine whether an undesired random or persistent signal corresponds to one or more modeled noises. When one or more noise components are detected, the noise components are substantially removed or dampened from the signal to provide a less noisy voice signal.

27 Claims, 8 Drawing Sheets

U.S. PATENT DOCUMENTS

| | | | | |
|---|---|---|---|---|
| 4,845,466 | A | 7/1989 | Hariton et al. | |
| 4,959,865 | A | 9/1990 | Stettiner et al. | |
| 5,012,519 | A * | 4/1991 | Adlersberg et al. | 704/226 |
| 5,027,410 | A | 6/1991 | Williamson et al. | |
| 5,056,150 | A | 10/1991 | Yu et al. | |
| 5,140,541 | A | 8/1992 | Sakata et al. | |
| 5,146,539 | A | 9/1992 | Doddington et al. | |
| 5,251,263 | A * | 10/1993 | Andrea et al. | 381/71.6 |
| 5,313,555 | A | 5/1994 | Kamiya | |
| 5,400,409 | A | 3/1995 | Linhard | |
| 5,426,703 | A | 6/1995 | Hamabe et al. | |
| 5,426,704 | A | 6/1995 | Tamamura et al. | |
| 5,442,712 | A | 8/1995 | Kawamura et al. | |
| 5,479,517 | A | 12/1995 | Linhard | |
| 5,485,522 | A | 1/1996 | Solve et al. | |
| 5,495,415 | A | 2/1996 | Ribbens et al. | |
| 5,502,688 | A | 3/1996 | Recchione et al. | |
| 5,526,466 | A | 6/1996 | Takizawa | |
| 5,550,924 | A | 8/1996 | Helf et al. | |
| 5,568,559 | A | 10/1996 | Makino | |
| 5,574,824 | A | 11/1996 | Slyh et al. | |
| 5,584,295 | A | 12/1996 | Muller et al. | |
| 5,586,028 | A | 12/1996 | Sekine et al. | |
| 5,617,508 | A | 4/1997 | Reaves | |
| 5,651,071 | A * | 7/1997 | Lindemann et al. | 381/314 |
| 5,677,987 | A | 10/1997 | Seki et al. | |
| 5,680,508 | A | 10/1997 | Liu | |
| 5,692,104 | A | 11/1997 | Chow et al. | |
| 5,701,344 | A | 12/1997 | Wakui | |
| 5,708,754 | A | 1/1998 | Wynn | |
| 5,727,072 | A | 3/1998 | Raman | |
| 5,752,226 | A | 5/1998 | Chan et al. | |
| 5,809,152 | A | 9/1998 | Nakamura et al. | |
| 5,859,420 | A | 1/1999 | Borza | |
| 5,878,389 | A * | 3/1999 | Hermansky et al. | 704/226 |
| 5,920,834 | A * | 7/1999 | Sih et al. | 704/233 |
| 5,933,495 | A * | 8/1999 | Oh | 379/406.08 |
| 5,933,801 | A | 8/1999 | Fink et al. | |
| 5,949,888 | A | 9/1999 | Gupta et al. | |
| 5,982,901 | A | 11/1999 | Kane et al. | |
| 6,011,853 | A | 1/2000 | Koski et al. | |
| 6,108,610 | A | 8/2000 | Winn | |
| 6,122,384 | A | 9/2000 | Mauro | |
| 6,122,610 | A | 9/2000 | Isabelle | |
| 6,130,949 | A | 10/2000 | Aoki et al. | |
| 6,163,608 | A | 12/2000 | Romesburg et al. | |
| 6,167,375 | A | 12/2000 | Miseki et al. | |
| 6,173,074 | B1 | 1/2001 | Russo | |
| 6,175,602 | B1 | 1/2001 | Gustafsson et al. | |
| 6,192,134 | B1 | 2/2001 | White et al. | |
| 6,199,035 | B1 | 3/2001 | Lakaniemi et al. | |
| 6,208,268 | B1 | 3/2001 | Scarzello et al. | |
| 6,252,969 | B1 | 6/2001 | Ando | |
| 6,289,309 | B1 * | 9/2001 | deVries | 704/233 |
| 6,405,168 | B1 | 6/2002 | Bayya et al. | |
| 6,415,253 | B1 * | 7/2002 | Johnson | 704/210 |
| 6,434,246 | B1 | 8/2002 | Kates et al. | |
| 6,449,594 | B1 | 9/2002 | Hwang et al. | |
| 6,453,285 | B1 * | 9/2002 | Anderson et al. | 704/210 |
| 6,507,814 | B1 | 1/2003 | Gao | |
| 6,510,408 | B1 | 1/2003 | Hermansen | |
| 6,587,816 | B1 | 7/2003 | Chazan et al. | |
| 6,615,170 | B1 | 9/2003 | Liu et al. | |
| 6,643,619 | B1 | 11/2003 | Linhard et al. | |
| 6,687,669 | B1 | 2/2004 | Schrögmeier et al. | |
| 6,711,536 | B2 | 3/2004 | Rees | |
| 6,741,873 | B1 | 5/2004 | Doran et al. | |
| 6,766,292 | B1 | 7/2004 | Chandran et al. | |
| 6,768,979 | B1 * | 7/2004 | Menendez-Pidal et al. | 704/226 |
| 6,782,363 | B2 | 8/2004 | Lee et al. | |
| 6,822,507 | B2 | 11/2004 | Buchele | |
| 6,859,420 | B1 | 2/2005 | Coney et al. | |
| 6,882,736 | B2 | 4/2005 | Dickel et al. | |
| 6,910,011 | B1 * | 6/2005 | Zakarauskas | 704/233 |
| 6,937,980 | B2 | 8/2005 | Krasny et al. | |
| 6,959,276 | B2 | 10/2005 | Droppo et al. | |
| 7,043,030 | B1 * | 5/2006 | Furuta | 381/94.1 |
| 7,062,049 | B1 | 6/2006 | Inoue et al. | |
| 7,072,831 | B1 | 7/2006 | Etter | |
| 7,092,877 | B2 * | 8/2006 | Ribic | 704/228 |
| 7,117,145 | B1 | 10/2006 | Venkatesh et al. | |
| 7,117,149 | B1 | 10/2006 | Zakarauskas | |
| 7,139,701 | B2 | 11/2006 | Harton et al. | |
| 7,158,932 | B1 | 1/2007 | Furuta | |
| 7,165,027 | B2 | 1/2007 | Kellner et al. | |
| 7,313,518 | B2 * | 12/2007 | Scalart et al. | 704/226 |
| 7,386,217 | B2 | 6/2008 | Zhang | |
| 2001/0028713 | A1 | 10/2001 | Walker | |
| 2002/0037088 | A1 | 3/2002 | Dickel et al. | |
| 2002/0071573 | A1 | 6/2002 | Finn | |
| 2002/0094100 | A1 | 7/2002 | Kates et al. | |
| 2002/0094101 | A1 | 7/2002 | De Roo et al. | |
| 2002/0152066 | A1 | 10/2002 | Piket | |
| 2002/0176589 | A1 | 11/2002 | Buck et al. | |
| 2002/0193130 | A1 | 12/2002 | Yang et al. | |
| 2003/0040908 | A1 * | 2/2003 | Yang et al. | 704/233 |
| 2003/0115055 | A1 | 6/2003 | Gong | |
| 2003/0147538 | A1 | 8/2003 | Elko | |
| 2003/0151454 | A1 | 8/2003 | Buchele | |
| 2003/0216907 | A1 | 11/2003 | Thomas | |
| 2004/0019417 | A1 | 1/2004 | Yasui et al. | |
| 2004/0078200 | A1 | 4/2004 | Alves | |
| 2004/0093181 | A1 | 5/2004 | Lee | |
| 2004/0138882 | A1 | 7/2004 | Miyazawa | |
| 2004/0161120 | A1 | 8/2004 | Petersen et al. | |
| 2004/0165736 | A1 | 8/2004 | Hetherington et al. | |
| 2004/0167777 | A1 | 8/2004 | Hetherington et al. | |
| 2005/0114128 | A1 | 5/2005 | Hetherington et al. | |
| 2005/0238283 | A1 | 10/2005 | Faure et al. | |
| 2005/0240401 | A1 | 10/2005 | Ebenezer | |
| 2006/0034447 | A1 | 2/2006 | Alves et al. | |
| 2006/0074646 | A1 | 4/2006 | Alves et al. | |
| 2006/0100868 | A1 | 5/2006 | Hetherington et al. | |
| 2006/0115095 | A1 | 6/2006 | Glesbrecht et al. | |
| 2006/0116873 | A1 | 6/2006 | Hetherington et al. | |
| 2006/0136199 | A1 | 6/2006 | Nongpiur et al. | |
| 2006/0251268 | A1 | 11/2006 | Hetherington et al. | |
| 2006/0287859 | A1 | 12/2006 | Hetherington et al. | |
| 2007/0019835 | A1 | 1/2007 | Ivo de Roo et al. | |
| 2007/0033031 | A1 | 2/2007 | Zakarauskas | |

FOREIGN PATENT DOCUMENTS

| | | | |
|---|---|---|---|
| CA | 2157496 | | 10/1994 |
| CA | 2158064 | | 10/1994 |
| CN | 1325222 | A | 12/2001 |
| CN | 1530929 | A | 9/2004 |
| EP | 0 076 687 | A1 | 4/1983 |
| EP | 0 629 996 | A2 | 12/1994 |
| EP | 0 629 996 | A3 | 12/1994 |
| EP | 0 750 291 | A1 | 12/1996 |
| EP | 1 450 353 | A1 | 8/2004 |
| EP | 1 450 354 | A1 | 8/2004 |
| EP | 1 669 983 | A1 | 6/2006 |
| JP | 64-039195 | | 2/1989 |
| JP | 06269084 | | 9/1994 |
| JP | 6 282 297 | | 10/1994 |
| JP | 06319193 | | 11/1994 |
| JP | 6 349 208 | | 12/1994 |
| JP | 2001-215992 | | 8/2001 |
| WO | WO 00-41169 | A1 | 7/2000 |
| WO | WO 01-56255 | A1 | 8/2001 |
| WO | WO 01-73761 | A1 | 10/2001 |

OTHER PUBLICATIONS

Udrea "Speech enhancement using spectral over-substraction and residual noise reduction", International Symposium on Signals, Circuits and Systems, IEEE 2003.*

Avendano, C., Hermansky, H., "Study on the Dereverberation of Speech Based on Temporal Envelope Filtering," Proc. ICSLP '96, pp. 889-892, Oct. 1996.

Fiori, S., Uncini, A., and Piazza, F., "Blind Deconvolution by Modified Bussgang Algorithm", Dept. of Electronics and Automatics—University of Ancona (Italy), ISCAS 1999.

Learned, R.E. et al., A Wavelet Packet Approach to Transient Signal Classification, Applied and Computational Harmonic Analysis, Jul.

1995, pp. 265-278, vol. 2, No. 3, USA, XP 000972660. ISSN: 1063-5203. abstract.
Nakatani, T., Miyoshi, M., and Kinoshita, K., "Implementation and Effects of Single Channel Dereverberation Based on the Harmonic Structure of Speech," Proc. of IWAENC-2003, pp. 91-94, Sep. 2003.
Quatieri, T.F. et al., Noise Reduction Using a Soft-Dection/Decision Sine-Wave Vector Quantizer, International Conference on Acoustics, Speech & Signal Processing, Apr. 3, 1990, pp. 821-824, vol. Conf. 15, IEEE ICASSP, New York, US XP000146895, Abstract, Paragraph 3.1.
Quelavoine, R. et al., Transients Recognition in Underwater Acoustic with Multilayer Neural Networks, Engineering Benefits from Neural Networks, Proceedings of the International Conference EANN 1998, Gibraltar, Jun. 10-12, 1998 pp. 330-333, XP 000974500. 1998, Turku, Finland, Syst. Eng. Assoc., Finland. ISBN: 951-97868-0-5. abstract, p. 30 paragraph 1.
Simon, G., Detection of Harmonic Burst Signals, International Journal Circuit Theory and Applications, Jul. 1985, vol. 13, No. 3, pp. 195-201, UK, XP 000974305. ISSN: 0098-9886. abstract.
Vieira, J., "Automatic Estimation of Reverberation Time", Audio Engineering Society, Convention Paper 6107, 116th Convention, May 8-11, 2004, Berlin, Germany, pp. 1-7.
Zakarauskas, P., Detection and Localization of Nondeterministic Transients in Time series and Application to Ice-Cracking Sound, Digital Signal Processing, 1993, vol. 3, No. 1, pp. 36-45, Academic Press, Orlando, FL, USA, XP 000361270, ISSN: 1051-2004. entire document.
European Search Report for Application No. 04003675.8-2218, dated May 12, 2004.
Puder, H. et al., "Improved Noise Reduction for Hands-Free Car Phones Utilizing Information on Vehicle and Engine Speeds", Sep. 4-8, 2000, pp. 1851-1854, vol. 3, XP009030255, 2000, Tampere, Finland, Tampere Univ. Technology, Finland Abstract.
Shust, Michael R. and Rogers, James C., Abstract of "Active Removal of Wind Noise From Outdoor Microphones Using Local Velocity Measurements", *J. Acoust. Soc. Am.*, vol. 104, No. 3, Pt 2, 1998, 1 page.
Shust, Michael R. and Rogers, James C., "Electronic Removal of Outdoor Microphone Wind Noise", obtained from the Internet on Oct. 5, 2006 at: <http://www.acoustics.org/press/136th/mshust.htm>, 6 pages.
Wahab A. et al., "Intelligent Dashboard With Speech Enhancement", Information, Communications and Signal Processing, 1997. ICIS, Proceedings of 1997 International Conference on Singapore, Sep. 9-12, 1997, New York, NY, USA, IEEE, pp. 993-997.
Berk et al., "Data Analysis with Microsoft Excel," Duxbury Press, 1998, pp. 236-239 and 256-259.
Seely, S., "An Introduction to Engineering Systems", Pergamon Press Inc., 1972, pp. 7-10.
Pellom, B.; Hansen, J., An Improved (Auto:I,LSP:T) Constrained Iterative Speech Enhancement for Colored Noise Environments, Speech and Audio Processing, IEEE Transactions on vol. 6, Issue 6, Nov. 1998, pp. 573-579.
Ephraim, Y., "Statistical-Model-Based Speech Enhancement Systems," *IEEE*, vol. 80, No. 10, 1992, pp. 1526-1555.
Godsill, S. et al., "Digital Audio Restoration," Department of Engineering, University of Cambridge, 1997, pp. 1-71.
Ljung, L., Chapter 1, "Introduction," *System Identification Theory for the User*, 2nd ed., Prentice Hall, Upper Saddle River, New Jersey, Copyright 1999, pp. 1-14.
Vaseghi, S. V., Chapter 12 "Impulsive Noise," *Advanced Digital Signal Processing and Noise Reduction*, 2nd ed., John Wiley and Sons, Copyright 2000, pp. 355-377.
Vaseghi, "Advanced Digital Signal Processing and Noise Reduction", Publisher, John Wiley & Sons Ltd., 2000, pp. 1-28, 333-354, and 378-395.
Boll, "Suppression of Acoustic Noise in Speech Using Spectral Subtraction", IEEE Trans. On Acoustics, Speech, and Signal Processing, Apr. 1979, pp. 113-120.

* cited by examiner

SIGNATURE NOISE REMOVAL

PRIORITY CLAIM

This application is a continuation-in-part of U.S. application Ser. No. 11/331,806 "Repetitive Transient Noise Removal," filed Jan. 13, 2006, which is a continuation-in-part of U.S. application Ser. No. 11/252,160 "Minimization of Transient Noise in a Voice Signal," filed Oct. 17, 2005, which is a continuation-in-part of U.S. application Ser. No. 10/688,802 "System for Suppressing Wind Noise," filed Oct. 16, 2003, which is a continuation-in-part of U.S. application Ser. No. 10/410,736, "Method and Apparatus for Suppressing Wind Noise," filed Apr. 10, 2003, which claims priority to U.S. application No. 60/449,511, "Method for Suppressing Wind Noise" filed on Feb. 21, 2003. The disclosures of the above applications are incorporated herein by reference. This application is also a continuation-in-part of U.S. application Ser. No. 11/006,935 "System for Suppressing Rain Noise," filed Dec. 8, 2004, which is a continuation-in-part of U.S. application Ser. No. 10/688,802 "System for Suppressing Wind Noise," filed Oct. 16, 2003, which is a continuation-in-part of U.S. application Ser. No. 10/410,736, "Method and Apparatus for Suppressing Wind Noise," filed Apr. 10, 2003, which claims priority to U.S. Application No. 60/449,511, "Method for Suppressing Wind Noise" filed on Feb. 21, 2003. The disclosures of the above applications are incorporated herein by reference.

BACKGROUND OF THE INVENTION

1. Technical Field

This invention relates to acoustics, and more particularly, to a system that enhances the perceptual quality of a processed voice.

2. Related Art

Many communication devices acquire, assimilate, and transfer a voice signal. Voice signals pass from one system to another through a communication medium. In some systems, including some systems used in vehicles, the clarity of the voice signal does not only depend on the quality of the communication system and the quality of the communication medium, but also on the amount of noise that accompanies the voice signal. When noise occurs near a source or a receiver, distortion often garbles the voice signal and destroys information. In some instances, noise may completely mask the voice signal so that the information conveyed by the voice signal may be unrecognizable either by a listener or by a voice recognition system.

Noise that may be annoying, distracting, or that results in lost information comes from many sources. Vehicle noise may be created by the engine, the road, the tires, the movement of air, and by many other sources. In the past, improvements in speech processing have been limited to suppressing stationary noise. There is a need for a voice enhancement system that improves speech processing by recognizing and mitigating one or more noises that may occur across a broad or a narrow spectrum.

SUMMARY

A speech enhancement system improves the perceptual quality of a processed voice signal. The system improves the perceptual quality of a received voice signal by removing unwanted noise from a voice signal detected by a device or program that converts sound waves into electrical or optical signals. The system removes undesirable signals that may result in the loss of information.

The system may model temporal and/or spectral characteristics of noises. The system receives and analyzes signals to determine whether a random or persistent signal corresponds to one or more modeled noise characteristics. When one or more noise characteristics are detected, the noise characteristics are substantially removed or dampened from the signal to provide a less noisy or clearer processed voice signal.

Other systems, methods, features, and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 6 is a block diagram of a speech enhancement system within a vehicle.

DETAILED DESCRIPTION OF THE PREFERRED EMBODIMENTS

A speech enhancement system improves the perceptual quality of a voice signal. The system models noises that may be heard within a moving or a stationary vehicle. The system analyzes a signal to determine whether characteristics of that signal have vocal or speech characteristics. If the signal lacks vocal or speech characteristics, the system may substantially eliminate or dampen undesired portions of the signal. Noise may be dampened in the presence or absence of speech, and may be detected and dampened in real time, near real-time, or after a delay, such as a buffering delay (e.g., about 300 to about 500 milliseconds). The speech enhancement system may also dampen or substantially remove continuous background noises, such as engine noise, and other noises, such as wind noise, tire noise, passing tire hiss noises, transient noises, etc. The system may also substantially dampen the "musical noise," squeaks, squawks, clicks, drips, pops, tones, and other sound artifacts generated by noise suppression systems.

Figure 1:
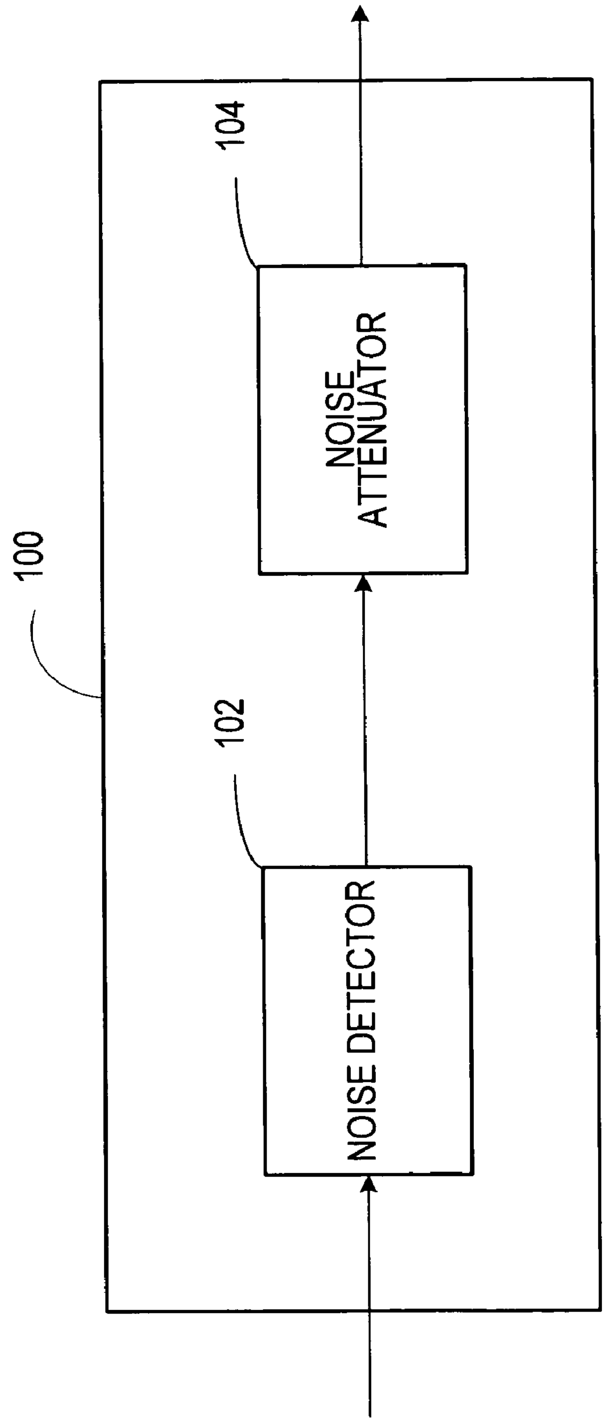
FIG. 1 is a partial block diagram of a speech enhancement system.

FIG. 1 is a partial block diagram of a speech enhancement system 100. The speech enhancement system 100 may encompass programmed hardware and/or software that may be executed on one or more processors. Such processors may be running one or more operating systems. The speech enhancement system 100 includes a noise detector 102 and a noise attenuator 104. A residual attenuator may also be used to substantially remove artifacts and dampen other unwanted components of the signal. The noise detector 102 may model one, two, three, or many more noises or a combination of noises. The noise(s) may have unique attributes that identify or make the noise distinguishable from speech or vocal sounds.

Audio signals (e.g., that may be detected from about 20 Hz to about 20 kHz (cycles per second)) may include both voice and noise components that may be distinguished through modeling. In one speech enhancement system, aural signals are compared to one or more models to determine whether the signals include noise or noise like components. When identified, these undesired components may be substantially removed or dampened to provide a less noisy aural signal.

Some noises have a temporal and/or a spectral characteristic that may be modeled. Through modeling, a noise detector 102 determines whether a received signal includes noise components that may be rapidly evolving or have non-periodic or periodic segments. When the noise detector 102 detects a noise component in a received signal, the noise may be dampened or nearly removed by the noise attenuator 104.

The speech enhancement system 100 may encompass any noise attenuating system that dampens or nearly removes one or more noises from a signal. Examples of noise attenuating systems that may be used to dampen or substantially remove noises from the a signal that may include 1) systems employing a neural network mapping of a noisy signal containing noise to a noise reduced signal; 2) systems that subtract the noise from a received signal; 3) systems that use the noise signal to select a noise-reduced signal from a code book; and 4) systems that process a noise component or signal to generate a noise-reduced signal based on a reconstruction of an original masked signal or a noise reduced signal. In some instances noise attenuators may also attenuate continuous noise that may be part of the short term spectra of the received signal. A noise attenuator may also interface with or include an optional residual attenuator for removing additional sound artifacts such as the "musical noise," squeaks, squawks, chirps, clicks, drips, pops, tones, or others that may result from the dampening or substantial removal of other noises.

Some noise may be divided into two categories: periodic noise and non-periodic noise. Periodic noise may include repetitive sounds such as turn indicator clicks, engine or drive train noise and windshield wiper noise. Periodic noise may have some harmonic structure due to its periodic nature. Non-periodic noise may include sounds such as transient road noises, passing tire hiss, rain, wind buffets, and other random noises. Non-periodic noises may occur at non-periodic intervals, may not have a harmonic structure, and may have a short, transient, time duration.

Speech may also be divided into two categories: voiced speech, such as vowel sounds and unvoiced speech, such as consonants. Voiced speech exhibits a regular harmonic structure, or harmonic peaks weighted by the spectral envelope that may describe the formant structure. Unvoiced speech does not exhibit a harmonic or formant structure. An audio signal including both noise and speech components may comprise any combination of non-periodic noises, periodic noises, and voiced and/or unvoiced speech.

The noise detector 102 may separate the noise-like components from the remaining signal in real-time, near real-time, or after a delay. Some noise detectors 102 separate the noise-like segments regardless of the amplitude or complexity of the received signal 101. When the noise detector 102 detects a noise, the noise detector 102 may model the temporal and/or spectral characteristics of the detected noise. The noise detector 102 may generate or retain a pre-programmed model of the noise, or store selected attributes of the model in a memory. Using a processor to process the model or attributes of the model, the noise attenuator 104 nearly removes or dampens the noise from the received signal 101. A plurality of noise models may be used to model the noise. Some models are combined, averaged, or manipulated to generate a desired response. Some other models are derived from the attributes of one or more noises as described by some of the patent applications incorporated by reference. Some models are dynamic. Dynamic models may be automatically manipulated or changed. Other models are static and may be manually changed. Automatic or manual change may occur when a speech enhancement system detects or identifies changing conditions of the received (e.g., input) signal.

Figure 2:
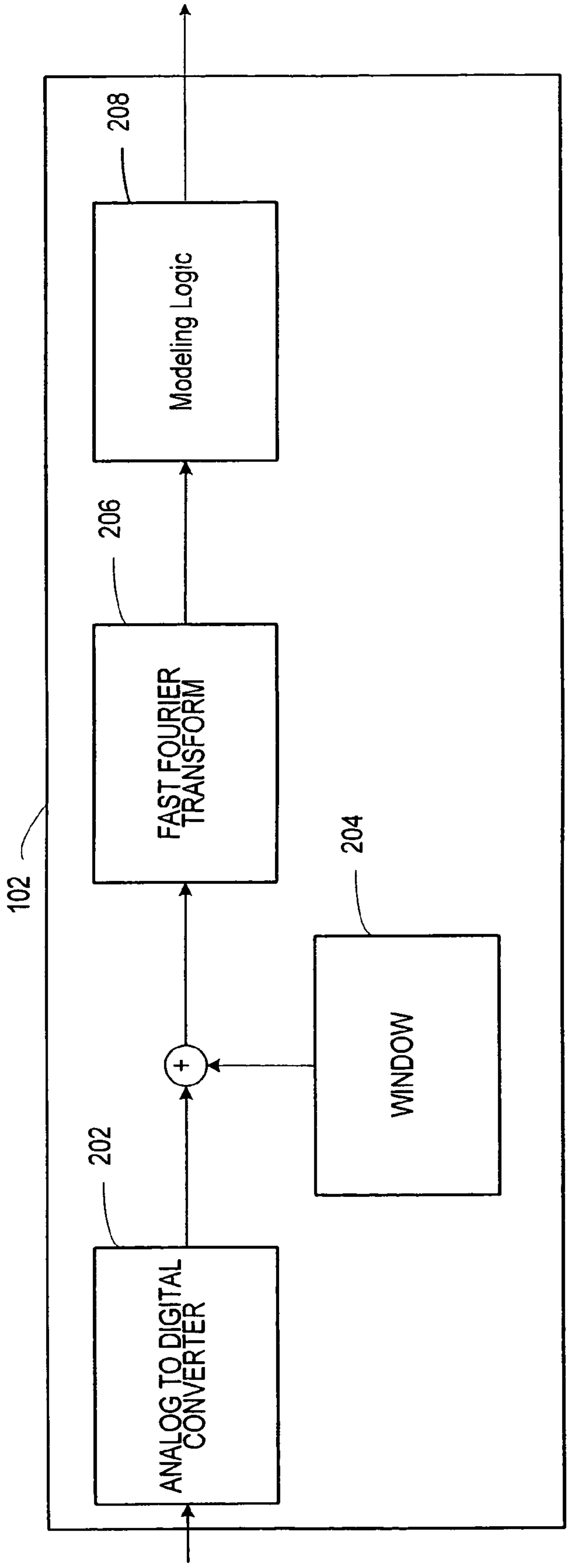
FIG. 2 is a block diagram of a noise detector.

FIG. 2 is a block diagram of an exemplary noise detector 102. The noise detector 102 receives or detects an input signal that may comprise speech, noise and/or a combination of speech and noise. The received or detected signal is digitized at a predetermined frequency. To assure good quality, the voice signal is converted into a pulse-code-modulated (PCM) signal by an analog-to-digital converter 202 (ADC) having a predetermined sample rate. A smoothing window function generator 204 generates a windowing function such as a Hanning window that is applied to blocks of data to obtain a windowed signal. The complex spectrum for the windowed signal may be obtained by means of a Fast Fourier Transform (FFT) 206 or other time-frequency transformation methods or systems. The FFT 206 separates the digitized signal into frequency bins, and calculates the amplitude of the various frequency components of the received signal for each frequency bin. The spectral components of the frequency bins may be monitored over time by a modeling logic 208.

Under some conditions, some speech enhancement systems process two aspects to model noise. The first aspect comprises modeling individual sound events that make up the noise, and the second may comprise modeling the appropriate temporal space between the individual events (e.g., two or more events). The individual sound events may have a characteristic shape. This shape, or attributes of the characteristic shape, may be identified and/or stored in a memory by the modeling logic 208. A correlation between the spectral and/or temporal shape of a received signal and a modeled shape or between attributes of the received signal spectrum and the modeled signal attributes may identify a potential noise component or segment. When a potential noise has been identified, the modeling logic 208 may look backward, forward, or forward and backward within the one or more time window to determine if a noise was received or identified.

Alternatively or additionally, the modeling logic 208 may determine a probability that the signal includes noise, and may identify sound events as a noise when a probability exceeds a pre-programmed threshold or exceeds a correlation value. The correlation and thresholds may depend on various factors that may be manually or automatically changed. In some speech enhancement systems, the factors depend on the presence of other noises or speech components within the input signal. When the noise detector 102 detects a noise, the characteristics of the detected noise may be communicated to the noise attenuator 104 and the noise may be substantially removed or dampened.

As more windows of sound are processed by some speech enhancement systems, the noise detector 102 may derive or modify some or all of its noise models. Some noise detectors derive average noise models for the individual sound events comprising noises, and in some circumstances, the temporal spacing if more than one noise event occurs. A time-smoothed or weighted average may be used to model continuous or non-continuous noise events for each frequency bin or for selected frequency bins. An average model may be updated when noise events are detected in the absence of speech. Fully bounding a noise when updating one exemplary average noise model may increase the probability of an accurate detection. A leaky integrator or weighted average or other logic may be used to model the interval between multiple or more than one sound events.

To minimize the "music noise," squeaks, squawks, chirps, clicks, drips, pops, or other sound artifacts, an optional residual attenuator may also condition the voice signal before it is converted to the time domain. The residual attenuator may be combined with the noise attenuator 104, combined with one or more other elements of the speech enhancement system, or comprise a separate stand alone element.

Some residual attenuators track the power spectrum within a low frequency range. In some circumstances, low frequency range may extend from about 0 Hz up to about 2 kHz. When a significant change or a large increase in signal power is detected, an improvement may be obtained by controlling (increasing or decreasing) or dampening the transmitted power in the low frequency range to a predetermined or a calculated threshold. One calculated threshold may be almost equal to, or may be based on, the average spectral power of a similar or the same frequency range monitored earlier in time.

Figure 3:
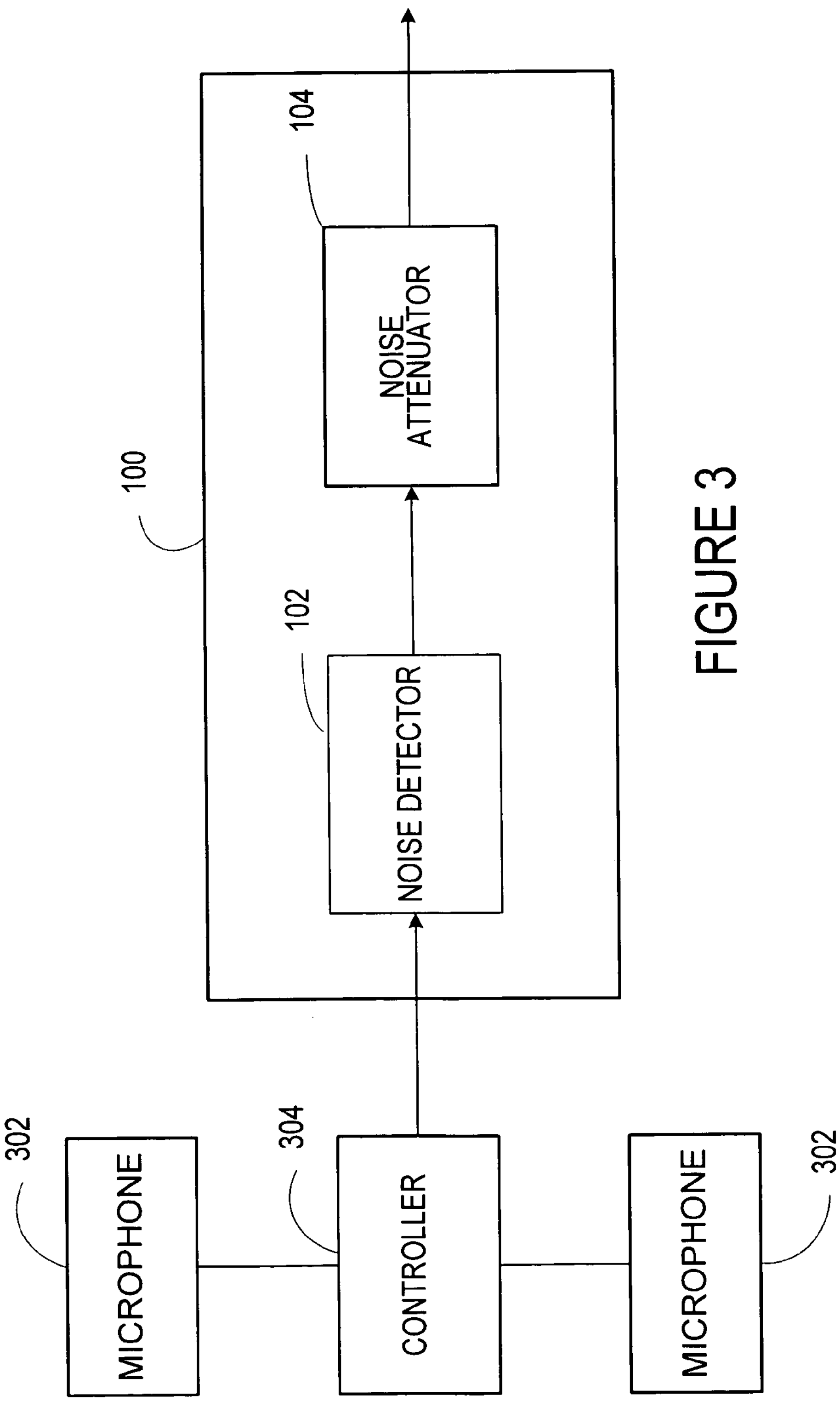
FIG. 3 is an alternative speech enhancement system.

Further improvements to voice quality may be achieved by pre-conditioning the input signal before it is processed by the noise detector 102. One pre-processing system may exploit the lag time caused by a signal arriving at different times at different detectors that are positioned apart from one another. If multiple detectors that convert sound into an electric or optic signal are used, such as the microphones 302 shown in FIG. 3, the pre-processing system may include a controller 304 or processor that automatically selects the detectors or microphone 302 or automatically selects the channel that senses the least amount of noise. When another microphone 302 is selected, the electric or optic signal may be combined with the previously generated signal before being processed by the noise detector 102.

Figure 4:
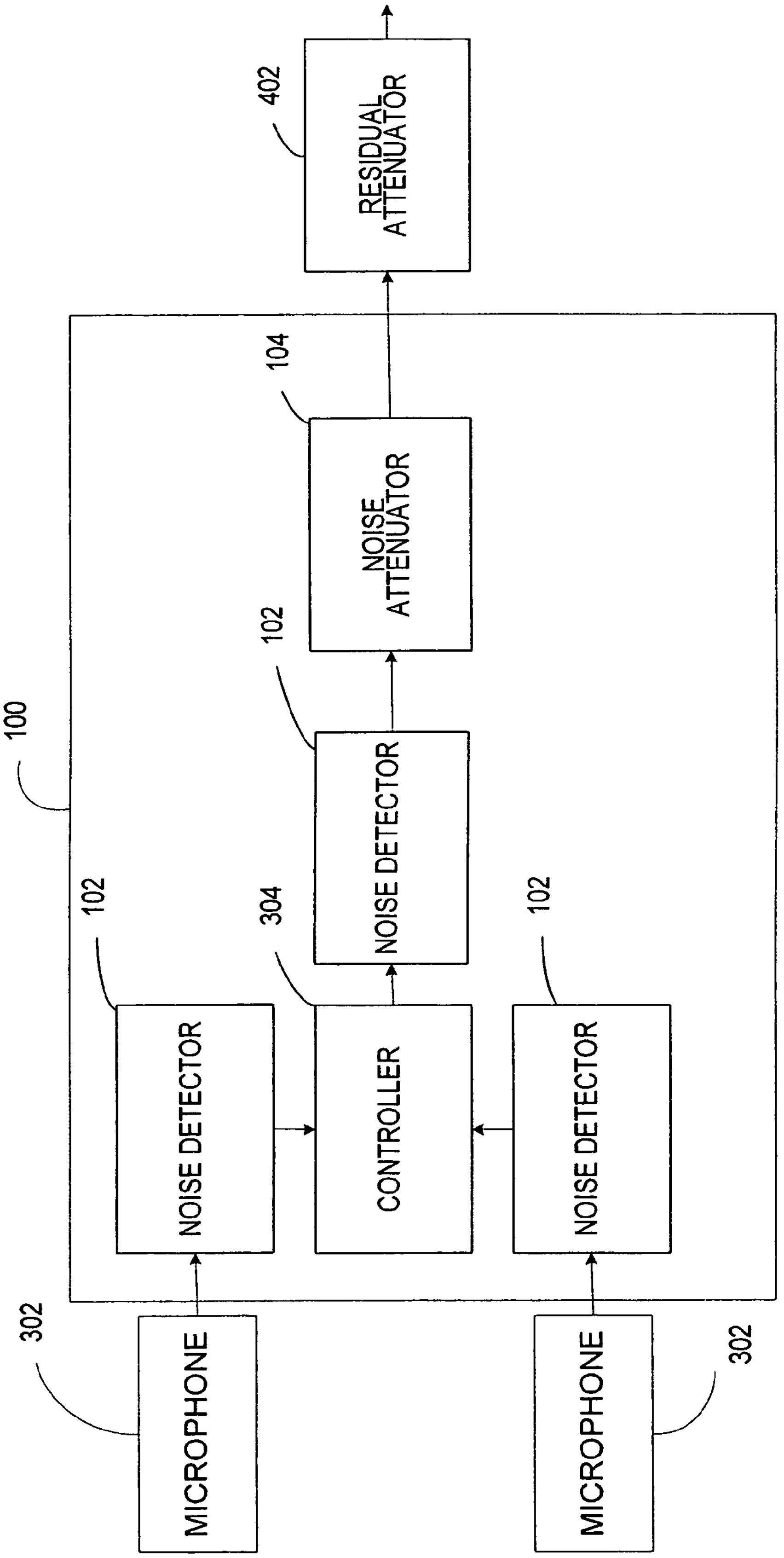
FIG. 4 is another alternative of speech enhancement system.

Alternatively, noise detection may be performed on each of the channels of sound detected from the detectors or microphones 302, respectively, as shown in FIG. 4. A mixing of one or more channels may occur by switching between the outputs of the detectors or microphones 302. Alternatively or additionally, the controller 304 or processor may include a comparator. In systems that may include or comprise a comparator, a direction of the signal may be generated from differences in the amplitude or timing of signals received from the detectors or microphones 302. Direction detection may be improved by pointing the microphones 302 in different directions or by offsetting their positions within a vehicle or area. The position and/or direction of the microphones may be automatically modified by the controller 304 or processor when the detectors or microphones are mechanized.

In some speech enhancement systems, the output signals from the detectors or microphones may be evaluated at frequencies above or below a certain threshold frequency (for example, by using a high-pass or low pass filter). The threshold frequency may be automatically updated over time. For example, when a vehicle is traveling at a higher speed, the threshold frequency for noise detection may be set relatively high, because the maximum frequency of some road noises increase with vehicle speed. Alternatively, a processor or the controller 304 may combine the output signals of more than one microphone at a specific frequency or frequency range through a weighting function. Some alternative systems include a residual attenuator 402; and in some alternative systems noise detection occurs after the signal is combined.

Figure 5:
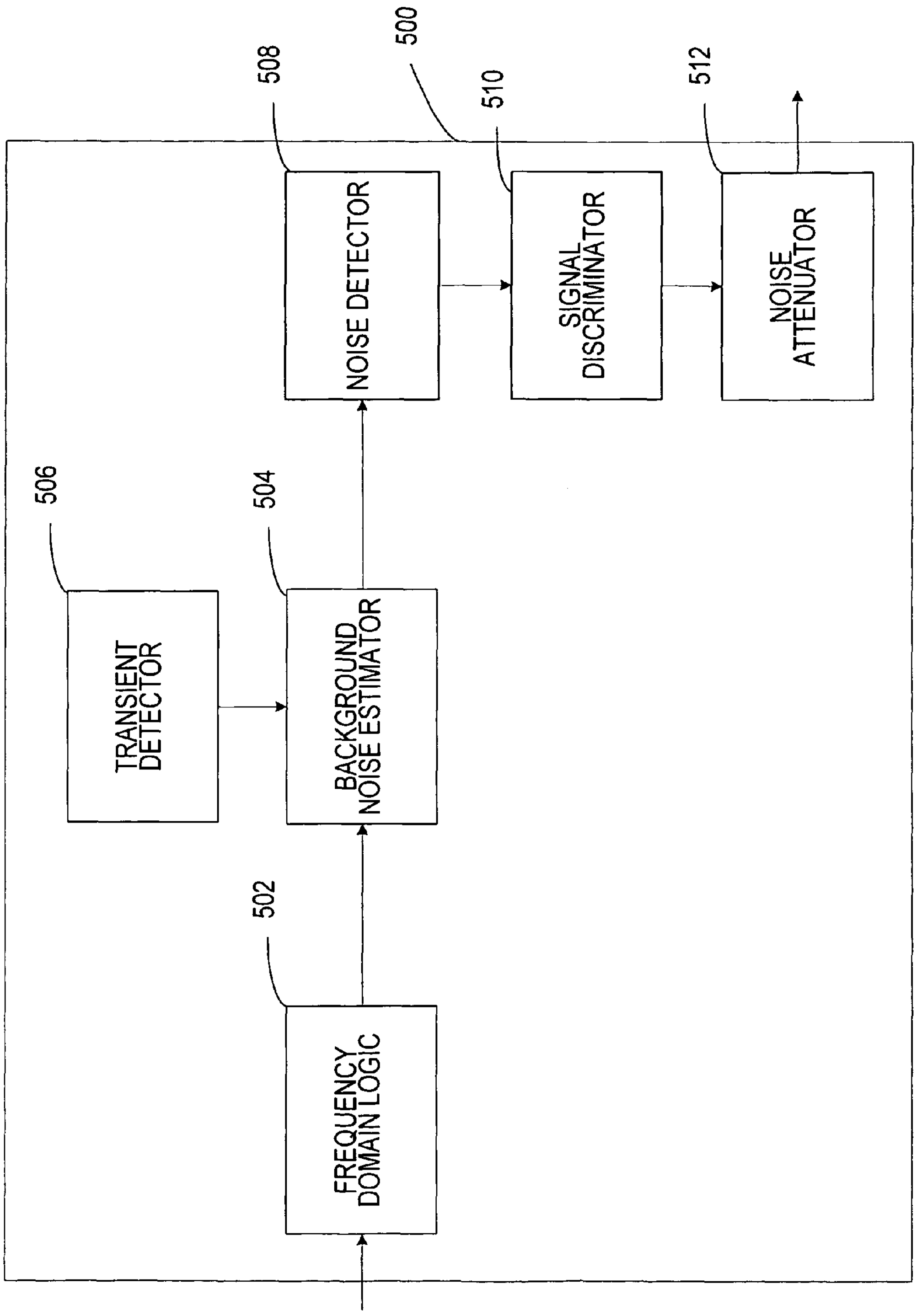
FIG. 5 is another alternative of speech enhancement system.

FIG. 5 is an alternative speech enhancement system 500 that improves the perceptual quality of a voice signal. Time-frequency transform logic 502 digitizes and converts a time varying signal into the frequency domain. A background noise estimator 504 measures the continuous, nearly continuous, or ambient noise that occurs near a sound source or the receiver. The background noise estimator 504 may comprise a power detector that averages the acoustic power in each frequency bin in the power, magnitude, or logarithmic domain.

To prevent biased background noise estimations, an optional transient noise detector 506 that detects short lived unpredictable noises may disable or modulate the background noise estimation process during abnormal or unpredictable increases in power. In FIG. 5, the transient noise detector 506 may disable the background noise estimator 504 when an instantaneous background noise B(f, i) exceeds an average background noise B(f)Ave by more than a selected decibel level 'c.' This relationship may be expressed as:

$$B(f,i) > B(f)\mathrm{Ave} + c \quad \text{(Equation 1)}$$

Alternatively or additionally, the average background noise may be updated depending on the signal to noise ratio (SNR). An example closed algorithm is one which adapts a leaky integrator depending on the SNR:

$$B(f)\mathrm{Ave}' = aB(f)\mathrm{Ave} + (1-a)S \quad \text{(Equation 2)}$$

where a is a function of the SNR and S is the instantaneous signal. In this example, the higher the SNR, the slower the average background noise is adapted.

To detect a sound event that may correspond to a noise that is not background noise, the noise detector 508 may fit a function to a selected portion of the signal in the time and/or frequency domain. A correlation between a function and the signal envelope in the time and/or frequency domain may identify a sound event corresponding to a noise event. The correlation threshold at which a portion of the signal is identified as a sound event corresponding to a potential noise may depend on a desired clarity of a processed voice signal and the variations in width and sharpness of the noise. Alternatively or additionally, the system may determine a probability that the signal includes a noise, and may identify a noise when that probability exceeds a probability threshold. The correlation and probability thresholds may depend on various factors. In some speech enhancement systems, the factors may include the presence of other noises or speech within the input signal. When the noise detector 508 detects a noise, the characteristics of the noise may be communicated to the noise attenuator 512 for dampening or substantial removal.

A signal discriminator 510 may mark the voice and noise components of the spectrum in real time, near real time or after a delay. Any method may be used to distinguish voice from noise. Spoken signals may be identified by (1) the narrow widths of their bands or peaks; (2) the broad resonances or formants that may be created by the vocal tract shape of the person speaking; (3) the rate at which certain characteristics change with time (e.g., a time-frequency model may be developed to identify spoken signals based on how they change with time); and when multiple detectors or microphones are used, (4) the correlation, differences, or similarities of the output signals of the detectors or microphones; and (5) by other methods.

Figure 6:
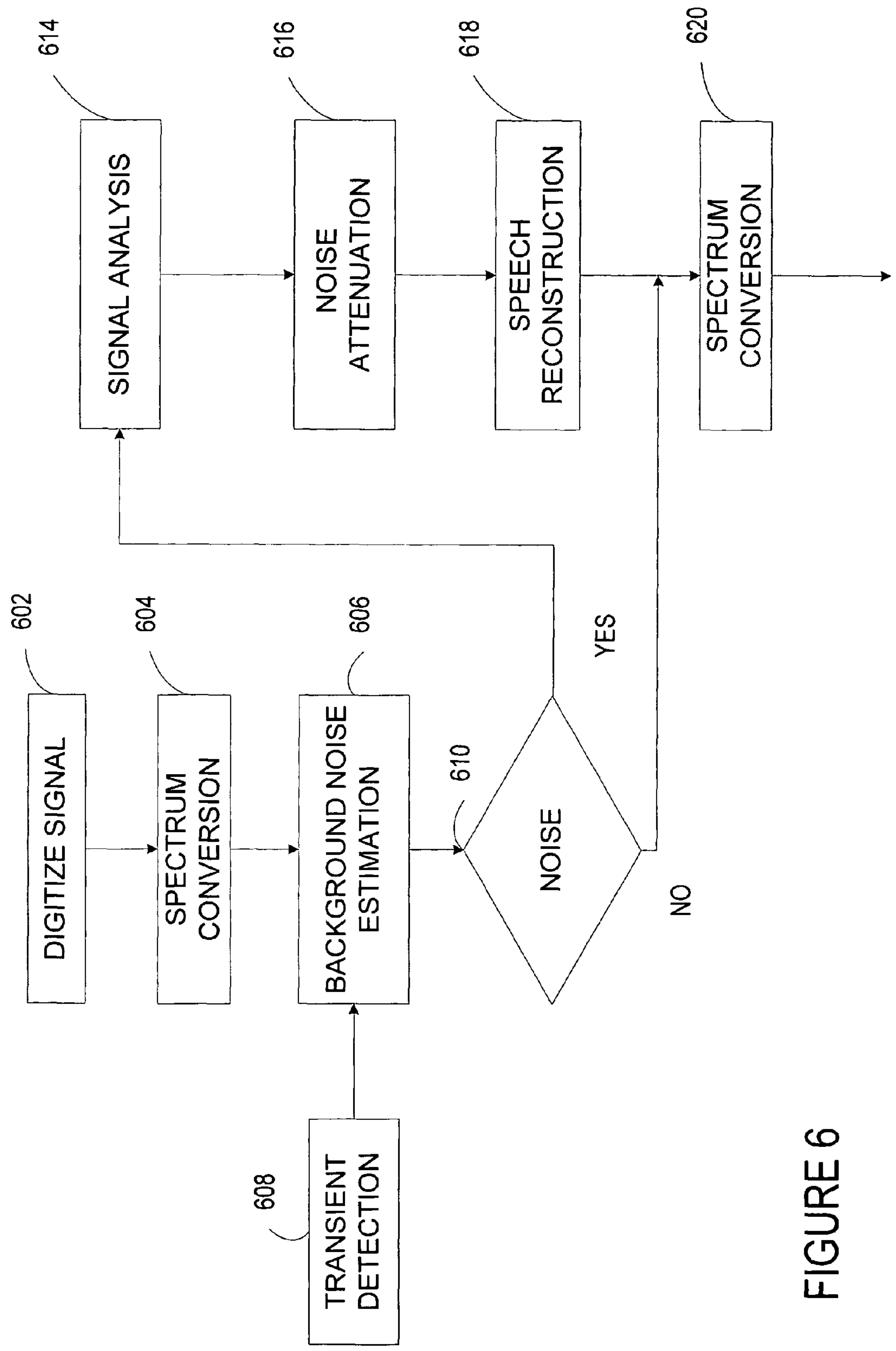
FIG. 6 is a flow diagram of a speech enhancement method.

FIG. 6 is a flow diagram of a speech enhancement system that substantially removes or dampens continuous or intermittent noise to enhance the perceptual quality of a processed voice signal. At 602 a received or detected signal is digitized at a predetermined frequency. To assure a good quality voice, the voice signal may be converted to a PCM signal by an ADC. At 604 a complex spectrum for the windowed signal may be obtained by means of an FFT that separates the digitized signals into frequency bins, with each bin identifying a magnitude and phase across a frequency range.

At 606, a continuous background or ambient noise estimate is determined. The background noise estimate may comprise an average of the acoustic power in each frequency bin. To prevent biased noise estimates during noise events, the noise estimate process may be disabled during abnormal or unexpected increases in detected power. In some speech enhancement systems, a transient noise detector or transient noise detection process 608 disables the background noise estimate when an instantaneous background noise exceeds an average background noise or a pre-programmed background noise level by more than a predetermined level.

At 610 a noise may be detected when one or more sound events are detected. The sound events may be identified by their spectral and/or temporal shape, by characteristics of their spectral and/or temporal shape, or by other attributes. When a pair of sound events identifies a noise, temporal spacing between the sound events may be monitored or calculated to confirm the detection of a re-occurring noise.

The noise model may be changed or manipulated automatically or by a user. Some systems automatically adapt to changing conditions. Some noise models may be constrained by rules or rule-based programming. For example, if a vowel or another harmonic structure is detected in some speech enhancement methods, the noise detection method may limit a noise correction. In some speech enhancement methods the noise correction may dampen a portion of signal or signal component to values less than or equal to an average value monitored or detected earlier in time. An alternative speech enhancement system may update one or more noise models or attributes of one or more noise models, such as the spectral and/or temporal shape of the modeled sound events to be changed or updated only during unvoiced speech segments. If a speech segment or mixed speech and noise segment is detected, the noise model or attributes of the noise model may not be changed or updated while that segment is detected or while it is processed. If no speech is detected, the noise model may be changed or updated. Many other optional rules, attributes, or constraints may include or apply to one or more of the models.

If a noise is detected at 610, a signal analysis may be performed at 614 to discriminate or mark the spoken signal from the noise-like segments. Spoken signals may be identified by (1) the narrow widths of their bands or peaks; (2) the broad resonances or formants, which may be created by the vocal tract shape of the person speaking; (3) the rate at which certain characteristics change with time (e.g., a time-frequency model may be developed to identify spoken signals based on how they change with time); and when multiple detectors or microphones are used, (4) the correlation, differences, or similarities of the output signals of the detectors or microphones, and (5) by other methods.

To overcome the effects of noises, a noise may be substantially removed or dampened at 616. One exemplary method that may be used adds the noise model to a recorded or modeled continuous noise. In the power spectrum, the modeled noise is then substantially removed or dampened from the signal spectrum. If an underlying speech signal is masked by a noise, or masked by a continuous noise, an optional conventional or modified interpolation method may be used to reconstruct the speech signal at an optional process 618. A time series synthesis may then be used to convert the signal power to the time domain at 620. The result may be a reconstructed speech signal from which the noise is dampened or has been substantially removed. If no noise is detected at 610, the signal may be converted into the time domain at 620 to provide the reconstructed speech signal.

The method of FIG. 6 may be encoded in a signal bearing medium, a computer readable medium such as a memory, programmed within a device such as one or more integrated circuits, or processed by a controller or a computer. If the methods are performed by software, the software may reside in a memory resident to or interfaced to the noise detector 102, processor, a communication interface, or any other type of non-volatile or volatile memory interfaced or resident to the speech enhancement system 100 or 500. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The above-described systems may condition signals received from only one or more than one microphone or detector. Many combinations of systems may be used to identify and track noises. Besides comparing a sound event to noise models to identify noise or analyzing characteristics of a signal to identify noise or potential noise components or segments, some systems may detect and isolate any parts of the signal having energy greater than the modeled sound events. One or more of the systems described above may also interface or may be a unitary part of alternative speech enhancement logic.

Other alternative speech enhancement systems comprise combinations of the structure and functions described above. These speech enhancement systems are formed from any combination of structure and function described above or illustrated within the figures. The system may be implemented in software or hardware. The hardware may include a processor or a controller having volatile and/or non-volatile memory and may also comprise interfaces to peripheral devices through wireless and/or hardwire mediums.

Figure 7:
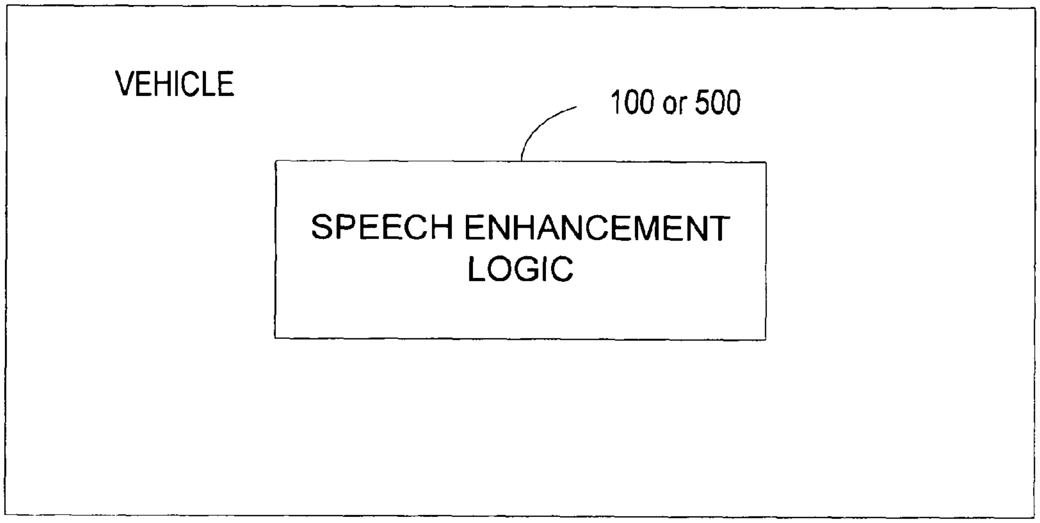
FIG. 7 is a block diagram of a speech enhancement system within a vehicle.
Figure 8:
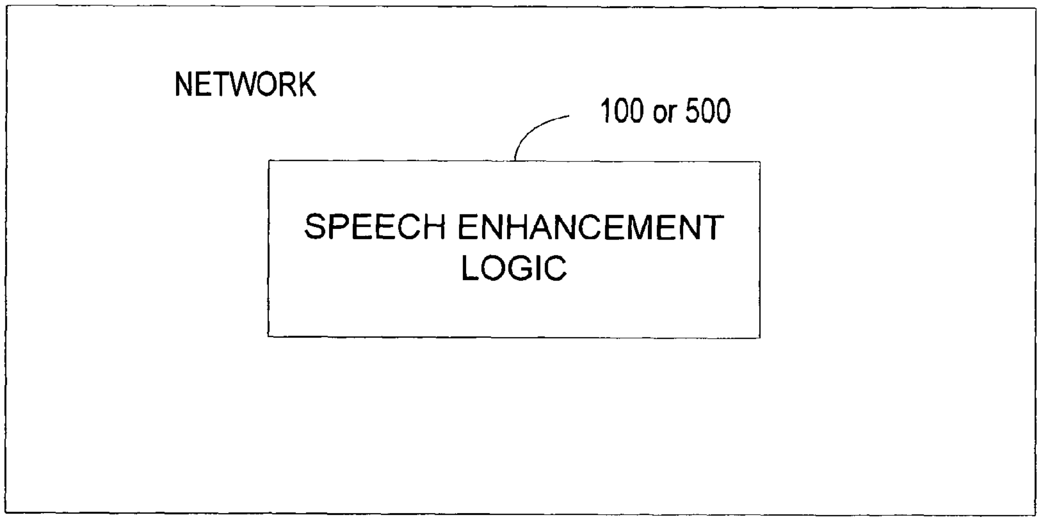
FIG. 8 is a block diagram of a speech enhancement system in communication with a network.
Figure 9:
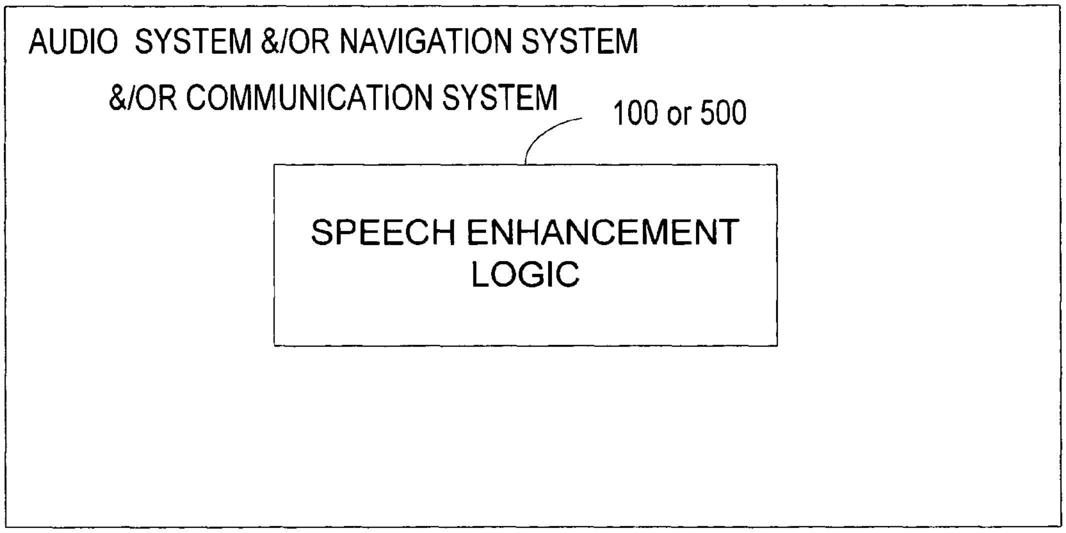
FIG. 9 is a block diagram of a speech enhancement system in communication with an audio system and/or a navigation system and/or a communication system.

The speech enhancement system is easily adaptable to any technology or devices. Some speech enhancement systems or components interface or couple vehicles as shown in FIG. 7, publicly or privately accessible networks (e.g., Internet and intranets) as shown in FIG. 8, instruments that convert voice and other sounds into a form that may be transmitted to remote locations, such as landline and wireless phones and audio systems as shown in FIG. 9, video systems, personal noise reduction systems, and other mobile or fixed systems that may be susceptible to transient noises. The communication systems may include portable analog or digital audio and/or video players (e.g., such as an iPod®), or multimedia systems that include or interface speech enhancement systems or retain speech enhancement logic or software on a hard drive, such as a pocket-sized ultra-light hard-drive, a memory such as a flash memory, or a storage media that stores and retrieves data. The speech enhancement systems may interface or may be integrated into wearable articles or accessories, such as eyewear (e.g., glasses, goggles, etc.) that may include wire free connectivity for wireless communication and music listening (e.g., Bluetooth stereo or aural technology) jackets, hats, or other clothing that enables or facilitates hands-free listening or hands-free communication.

The speech enhancement system improves the perceptual quality of a voice signal. The logic may automatically learn and encode the shape and form of the noise associated with a noise in real time, near real time or after a delay. By tracking selected attributes, some system may eliminate, substantially eliminate, or dampen noise using a limited memory that temporarily or permanently stores selected attributes or models of the noise. The speech enhancement system may also dampen a continuous noise and/or the squeaks, squawks, chirps, clicks, drips, pops, tones, or other sound artifacts that may be generated by some speech enhancement systems and may reconstruct voice when needed.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A speech enhancement system operative to suppress noise from a received signal comprising:

a background noise estimator that measures a background noise level in the received signal;

a transient noise detector operative to store a model of a noise component within a memory and operative to detect the presence of a transient noise in the received signal; and a noise attenuator in communication with the transient noise detector and operative to substantially remove the transient noise from the received signal when an attribute of the received signal substantially matches an attribute of the stored model of the noise component;

where the transient noise detector is operative to disable or modulate the background noise estimator during a period of time when an instantaneous background noise level of the received signal exceeds an average background noise level of the received signal by more than a predetermined threshold.

2. The system of claim 1 where the noise detector is operative to compare the attribute of the received signal to the attribute of the stored model of the noise component, and where the transient noise detector comprises circuitry or a computer-readable storage medium that stores instructions executable by a processor to detect the presence of the transient noise in the received signal.

3. The system of claim 2 where the model of the noise component comprises a spectral attribute of the noise component and a temporal attribute of the noise component.

4. The system of claim 3 where the temporal component comprises a first sound event and a substantially similar second sound event separated by a period of time.

5. The system of claim 3 where the spectral component comprises one or more attributes of a spectral shape of a sound event associated with a road noise.

6. The system of claim 3 where the noise detector and the noise attenuator are coupled to a vehicle.

7. The system of claim 1 where the model of the noise component comprises a dynamic model, and where the noise detector changes the dynamic model in response to detection of changing conditions in the received signal.

8. The system of claim 1, where the transient noise detector comprises modeling logic that fits a function to a selected portion of the received signal in a time-frequency domain to evaluate the spectro-temporal shape characteristics of a sound event in the received signal, and where the modeling logic identifies the sound event as a noise event based on a correlation between the function and a signal envelope of the sound event.

9. The system of claim 1, where the noise attenuator is operative to add the stored model of the noise component to a recorded or modeled continuous noise for removal from the received signal when the transient noise is detected in the received signal.

10. A noise detector operative to detect a noise that may affect a signal comprising:

an analog to digital converter operative to convert a received signal into a digital signal;

a windowing function operative to separate the received signal into a plurality of signal analysis windows;

a transform logic operative to transform the plurality of signal analysis windows to the frequency domain; and a modeling logic operative to store attributes of a noise, and compare the stored attributes to a transformed signal to identify a noise, where the modeling logic fits a function to a selected portion of the transformed signal in a time-frequency domain to evaluate the spectro-temporal shape characteristics of a sound event in the transformed signal, and where the modeling logic identifies the sound event as a noise event based on a correlation between the function and a signal envelope of the sound event.

11. The noise detector of claim 10 where the analog to digital converter converts the received signal into a pulse code modulated signal.

12. The noise detector of claim 10 where the windowing function comprises a Hanning window function generator.

13. The noise detector of claim 10 where the transform module comprises a Fast Fourier Transform logic.

14. The noise detector of claim 13 where the attributes of the noise comprise a temporal characteristic substantially unique to an undesired signal.

15. The noise detector of claim 13 where the attributes of the noise comprise a spectral characteristic substantially unique to an undesired signal.

16. The noise detector of claim 13 where the attributes of the noise comprise temporal characteristics and spectral characteristics substantially unique to an undesired signal.

17. The noise detector of claim 16 where the attributes of the noise comprise spectral shape characteristics of two sound events.

18. The noise detector of claim 17 where the modeling logic is operative to fit a function to a selected portion of the signal in a time-frequency domain to evaluate the spectro-temporal shape characteristics of the two sound events.

19. The noise detector of claim 13 further comprising a residual attenuator operative to track the power spectrum of the received signal.

20. The noise detector of claim 19 where the residual attenuator is operative to limit the transmitted power in a low frequency range to a predetermined threshold when a large increase in signal power is detected.

21. The noise detector of claim 20 where the predetermined threshold is based on the average spectral power of the received signal in the low frequency range from an earlier period in time.

22. The noise detector of claim 10, where the modeling logic comprises circuitry or a computer-readable storage medium that stores instructions executable by a processor to identify the noise.

23. A method operative to substantially remove noises from a signal comprising:

modeling characteristics of a noise to generate a noise model;

analyzing the signal to determine whether characteristics of the signal correspond to characteristics of the noise model;

fitting a function to a selected portion of the signal in a time-frequency domain to evaluate the spectro-temporal shape characteristics of a sound event in the signal;

identifying the sound event as a noise event based on a correlation between the function and a signal envelope of the sound event; and applying the signal to a noise attenuator that removes characteristics of the sound event from the signal when the sound event is identified as the noise event.

24. The method of claim 23 further comprising modeling a temporal separation between more than one sound event.

25. The method of claim 24 where the spectral shape attributes of the more than one sound event comprises a broadband event with peak energy levels occurring at relatively lower frequencies.

26. The method of claim 23, where the act of applying the signal to the noise attenuator comprises adding the noise model to a recorded or modeled continuous noise for removal from the signal.

27. The method of claim 23, where the noise attenuator comprises circuitry or a computer-readable storage medium that stores instructions executable by a processor to remove the characteristics of the sound event from the signal.

* * * * *